United States Patent
Hall et al.

[19]

[11] Patent Number: 6,128,758
[45] Date of Patent: Oct. 3, 2000

[54] MODULAR RE-USEABLE BUS ARCHITECTURE

[75] Inventors: Christopher Hall, Redwood City; Rajat Sewal, Livermore; Jumana Muwafi, San Francisco, all of Calif.

[73] Assignee: National Semiconductor Corporation, Santa Clara, Calif.

[21] Appl. No.: 09/082,457

[22] Filed: May 20, 1998

[51] Int. Cl.[7] .................................................. G01R 13/28
[52] U.S. Cl. ............................. 714/727; 714/27; 714/30
[58] Field of Search ........................ 710/100; 714/25–31, 714/726, 731

[56] References Cited

U.S. PATENT DOCUMENTS

| | | | |
|---|---|---|---|
| 4,491,935 | 1/1985 | Ozawa et al. | 395/518 |
| 4,698,754 | 10/1987 | Koshino et al. | 714/53 |
| 5,005,173 | 4/1991 | Martin | 714/734 |
| 5,406,216 | 4/1995 | Millman et al. | 327/202 |
| 5,450,415 | 9/1995 | Kamada | 714/727 |
| 5,504,756 | 4/1996 | Kim et al. | 714/729 |
| 5,617,531 | 4/1997 | Crouch et al. | 714/30 |
| 5,675,589 | 10/1997 | Yee | 395/500.05 |
| 5,732,091 | 3/1998 | Whetsel | 714/727 |
| 5,742,617 | 4/1998 | Warren | 714/726 |
| 5,774,473 | 6/1998 | Harley | 714/30 |
| 5,781,702 | 7/1998 | Alhalabi | 706/27 |
| 5,812,561 | 9/1998 | Giles et al. | 714/726 |
| 5,872,793 | 2/1999 | Attaway et al. | 714/726 |
| 5,958,076 | 9/1999 | Kishi | 714/726 |

*Primary Examiner*—Paul R. Myers
*Attorney, Agent, or Firm*—Skjerven Morrill MacPherson; Edward C. Kwok

[57] ABSTRACT

A modular reusable bus architecture enhances testability of an integrated computer system in which multiple modules communicate over a system bus. Under the modular reusable bus architecture, the system bus can be configured to operate in different operation modes. In one embodiment, the bus architecture provides a test mode for testing an individual module within the integrated computer system, separate from the other modules. In another embodiment, the bus architecture configures the system bus to provide access to configuration registers and memory units disposed within each module, otherwise inaccessible in normal system operation. The modular reusable architecture can support any types and any number of modules, including modules incorporating analog and digital circuitry, and modules operating under different clock domains.

13 Claims, 3 Drawing Sheets

MODULAR RE-USEABLE BUS ARCHITECTURE

BACKGROUND OF THE INVENTION

1. Field of the Invention

The invention generally relates to a bus architecture for a computer system; and in particular, the present invention relates to a bus architecture which enhances the testability of an integrated computer system.

2. Background of the Invention

In a computer system in which a combination of modules are coupled to each other over a bus, a bus architecture defines the framework for communication among the modules.

In a computer system where the modules are not integrated, such as a PC board in which a number of integrated circuit (IC) devices implements the modules, each module of the system can usually be tested individually. However, when these modules, or functional elements, are integrated onto a single IC device, the input and output nodes of an individual module within the IC device are no longer directly accessible, since the input and output nodes of an individual module have become internal nodes of the IC device. In an integrated circuit, the modules are tested by applying and reading signals at the external input and output pins of the integrated circuit. Debugging of the IC device is particularly difficult when the internal nodes of the device are not directly accessible.

When analog circuitry is integrated with digital circuitry on a single IC device, testing is even more difficult as there is often a need to test the analog circuitry apart from the digital circuitry, and vice versa. It is often desirable to test analog circuits using analog signals and digital circuits using digital signals. But separate testing of the digital and analog portions of an integrated analog-digital device is difficult because the connections between the analog and digital circuits are internal nodes which are not accessible directly from the external device pins. For example, in a signal processing device, an analog-to-digital converter (ADC) is coupled to a digital signal processor (DSP). In such a signal processing device, the ADC provides from analog signals digitized data for the DSP to perform filtering and conditioning functions. Typically, the digitized data generated from the ADC are coupled to the DSP on internal nodes and are not available to external device pins. Thus, when the signal processing device fails, it may be difficult to ascertain the cause of the failure.

Therefore, in an integrated computer system, there is a need to enhance testability by providing access to the internals nodes of the modules within the integrated system. Because these nodes are generally numerous and device pins are scarce, it is not feasible to merely provide these internal nodes directly to external device pins. Thus, it would be desirable to provide a bus architecture which allows access to internal nodes of an integrated device without requiring a substantial number of additional external device pins.

Further, in designing a bus architecture for an integrated modular system, it is desirable to provide a bus architecture design which has a high degree of portability. When a bus architecture can be readily adapted for use in other computer systems, significant cost saving in design and development of subsequent products can be achieved.

In an IC device, the modules within the device may be synchronized to different clock frequencies. When data signals cross between different clock domains, the data signals have to be resynchronized to the new clock domain. Prior art approaches to resynchronizing signals crossing between different clock domains are not satisfactory. One problem with prior art resynchronizing method is that it is difficult to predict which clock cycle the final synchronized signal will appear. Even though data accuracy is preserved, the final synchronized signal may appear unpredictably at one of several clock cycles because of jittering between related clock edges. This makes automatic testing of the IC device impossible because the output data is not available at a consistent clock cycle to allow the tester to retrieve the data for comparison. Another problem with the prior art approach is that data coherency across a parallel data bus is not maintained. Because the resynchronized signal of each bit line of the parallel bus may not all appear within the same clock cycle, the resynchronized signal across the bus is corrupted after crossing the clock boundary. Therefore, an improved synchronized technique which can guarantee signal coherency and predictability for signals crossing over different clock domains is desired.

SUMMARY OF THE INVENTION

According to the present invention, a modular reusable bus architecture is provided for use in a computer system (e.g., an integrated circuit (IC) device), in which multiple modules communicate over a system bus. The modular reusable bus architecture of the present invention enhances the testability of an integrated computer system, and is adaptable for use in any computer system independent of the types of modules incorporated therein. Besides supporting communications between the modules within the computer system in their normal operations, the modular reusable bus architecture of the present invention allows the same system bus to be re-used in a different operation mode. In one instance, the bus architecture provides a test mode whereby either an individual module or a combination of modules within the computer system can be tested without adding a substantial number of external test pins.

One significant feature of the modular reusable bus architecture of the present invention configures the system bus to provide access to internal registers otherwise inaccessible from the external input/output ports of the computer system. This feature of the modular reusable bus architecture significantly enhances the testability of an integrated computer system.

Another significant feature of the modular reusable bus architecture of the present invention supports any types and any number of modules incorporated within a computer system. This feature of the modular reusable bus architecture is particularly useful in an IC device integrating both analog and digital functions. In one embodiment, the modular reusable bus architecture of the present invention can be adapted in an analog-digital IC device to allow the analog and digital circuits in the device to be tested separately.

In one embodiment, an integrated device employing the modular reusable bus architecture includes a first module, a second module, a third module and a fourth module. The modules communicate with each other over a system bus and each includes configuration registers and memory units. The modular reusable bus architecture allows the modules of the integrated device to be tested individually. Furthermore, the modular reusable bus architecture facilitates testing of the configuration registers and memory units, otherwise inaccessible under the normal operation of the integrated device.

In the present embodiment, an input bus is coupled to the input terminals of the first module. The output terminals of the first module are connected to the first set of input terminals of a first multiplexer as well as to the input terminals of a first buffer. The output terminals of the first buffer is coupled to a bi-directional test bus. The test bus is also coupled to the second set of input terminals of the first multiplexer.

A second multiplexer is provided to select address input either from the test bus or from the fourth module. An address bus connects the output terminals of the second multiplexer to input terminals of the configuration registers and memory units.

A third multiplexer is provided to select input data from either a bi-directional data bus or from the fourth module. A data-in bus connects the output terminals of the third multiplexer to input terminals of the configuration registers and memory units.

Output data signals from the configuration registers and memory units are provided on a data-out bus. A fourth multiplexer is provided to select output data either from the third module as in the normal operation, or from the data-out bus. The output data signals are coupled to a second buffer. When the second buffer is enabled, the output data signals are driven onto the data bus.

According to one aspect of the present invention, a test mode is provided whereby the first module is tested separately from the other modules of the integrated device. Under the test mode, input signals are applied to the input bus. The first buffer is enabled such that the output data on output terminals of the first module are provided to the test bus. The test bus can then be monitored for the output signals from the first module.

According to another aspect of the present invention, a bypass mode is provided whereby the modules of the integrated device, except the first module, are tested using input signals from an external tester, instead of using output signals from the first module. Under the bypass mode, the first buffer is disabled. Input signals are applied to the test bus from an external tester. The first multiplexer selects the input signals from the test bus and provides the input signals to the second module. The output signals from the modules can be monitored as in their normal operation.

In yet another aspect of the present invention, a module test mode is provided for testing the configuration registers and memory units of the modules. Under the module test mode, address signals are provided by an external tester on the test bus. The second multiplexer provides the address signals to the address input terminals of the configuration registers and memory units. Data-in signals are provided by the external tester on the data bus while the second buffer is disabled. The third multiplexer provides the data-in signals to the input data terminals of the configuration registers and memory units. Output data from the configuration registers and memory units are provided on the data-out bus. The fourth multiplexer passes the output data signals from the data-out bus to the second buffer. When the second buffer is enabled, the output data signals are provided to the data bus for output to the external tester.

The modular reusable bus architecture of the present invention can support a large number of registers and memory units. Therefore, special purpose registers and memory units can be included in each module for testing and diagnostic purposes.

In the present embodiment, the different operating modes of the integrated device are selected through a control register provided in the fourth module. Furthermore, a paging register in the fourth module controls access to the configuration registers and memory units. In one aspect of the present invention, the paging register is used to expand the memory space of the registers and memory units.

In another aspect of the present invention, a locking mechanism is provided to protect the paging register from an inadvertent access. The locking mechanism requires a key value and its complement to be provided to unlock the paging register.

In another aspect of the present invention, a two-level buffering technique is employed to reduce the capacitive loading on the data-out bus.

In another aspect of the present invention, when the modules of the integrated device are operating under different clock frequencies, a synchronization circuit is provided to resynchronize the data signals crossing between different clock domains while preserving data coherency and predictability.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

One embodiment of the present invention is provided in an integrated demodulation device for use in a cable modem application. In this embodiment, the integrated demodulation device is designed to process incoming analog signals encoded under quadrature amplitude modulation (QAM). The demodulation device demodulates the incoming analog signals using a predefined demodulation algorithm to recover digital data ("symbol") from the QAM modulated carrier waveform.

Figure 1:
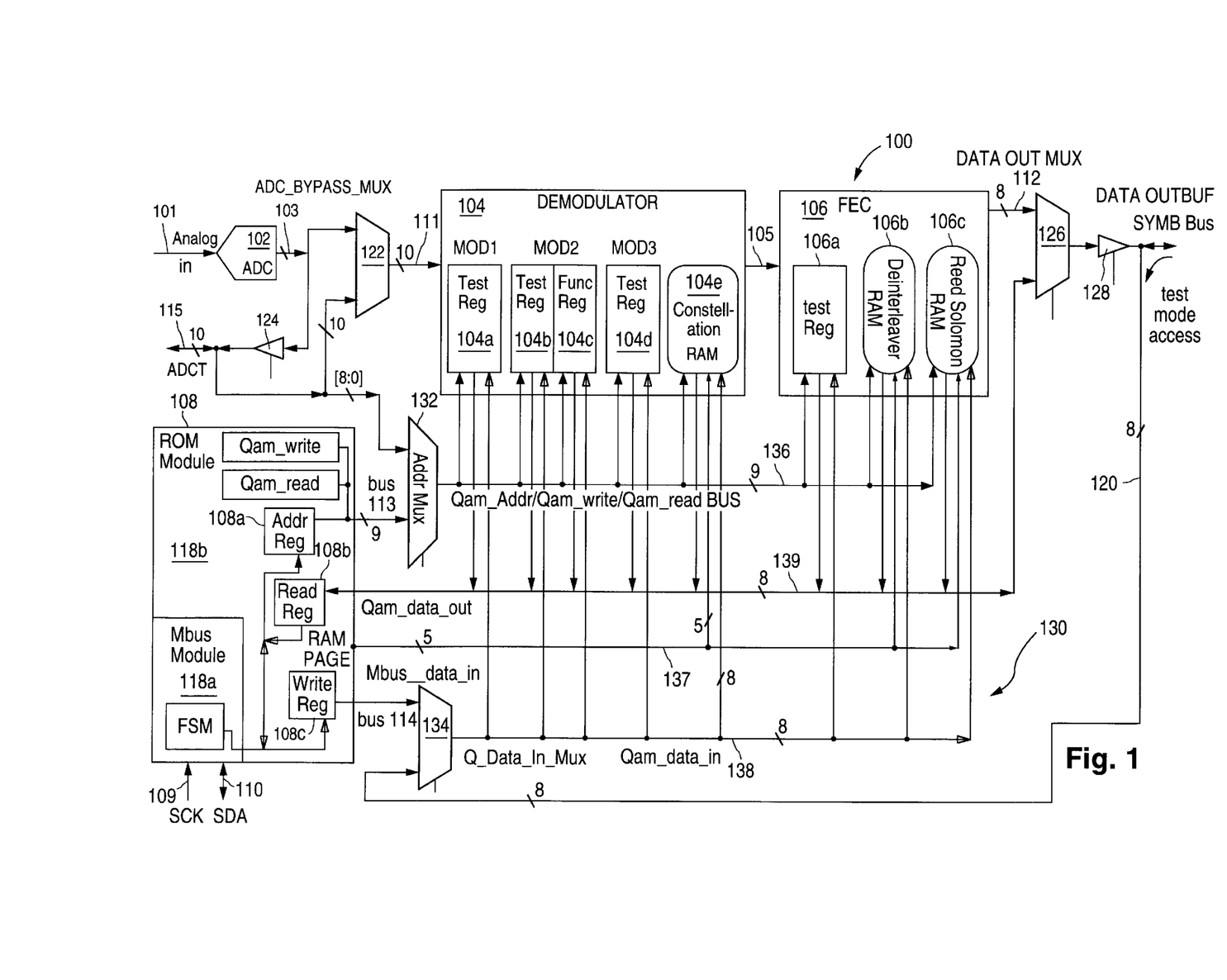
FIG. 1 is a block diagram of a demodulation device 100 employing a modular reusable bus architecture of the present invention.

FIG. 1 illustrates the block diagram of an integrated demodulation device 100 employing the bus architecture of the present invention. Demodulation device 100 includes an analog-to-digital converter (ADC) module 102, a demodulator module 104, a forward error correction (FEC) module 106, and a host interface module 108. Each module of demodulation device 100 includes configuration registers and memory units, such as random access memories (RAMs). The configuration registers and RAMs of each module store set-up data and run time data for the module. In FIG. 1, demodulator module 104 is shown with functional registers 104*c*, which are used in the demodulation operations, and a constellation RAM 104*e*, which contains the magnitude and the phase defining each symbol. FEC module 106 is shown with a deinterleaver RAM 106*b* and a Reed-Solomon RAM 106*c*, used in error correction operations. Host interface module 108, which interfaces demodulation device 100 to a host computer, is shown with address register 108a, read register 108b, and write register 108c.

In a conventional demodulation device, the internal configuration registers and RAMs of the device are only accessed during device initialization, and are not subsequently accessible from the external input/output ports of the device. During normal device operation, read or write accesses to the registers and RAMs are limited to specific operations performed by specific modules. The present invention provides access through the modular reusable bus architecture to these internal registers and RAMs of the modules to facilitate testing of the modules.

Because the modular reusable bus architecture of the present invention can support a large number of registers, testing and diagnostic registers can be included. In the embodiment shown in FIG. 1, test registers 104a, 104b, and 104d are included in demodulator module 104. Similarly, test register 106a is included in FEC module 106. These test registers can be configured to store an array of status information concerning the operation of the module. The bus architecture allows these registers to be read at the external input/output ports of demodulation device 100. The diagnostic capability of demodulation device 100 is greatly enhanced because the test registers can be read to obtain a snap shot of the operational status of each of the modules.

During normal operation, demodulation device 100 is initialized with the values of the parameters of the demodulation algorithm, such as filter coefficients and the attributes of digitized data to be gathered. During initialization, a host processor (not shown) provides control information to host interface module 108 on serial data lines 109 and 110. Host interface module 108 processes the control information received to generate corresponding set-up data for demodulator module 104 and FEC module 106. Set-up data is then written into the configuration registers and RAMS of the respective modules, such as functional registers 104c and Constellation RAM 104e in demodulator module 104, and Deinterleaver RAM 106b and Reed-Solomon RAM 106c in FEC module 106. During device operation, host interface module 108 also collects operation data over bidirectional bus system 130 from demodulator module 104 and FEC module 106 and relays the data back to the host processor through serial data line 110.

In this embodiment, the host processor and demodulation device 100 operate under the Motorola bus protocol and communication between the host processor and demodulation device 100 is in serial data format. Two serial input data signals are provided to host interface module 108: signal SCK (serial clock) on serial data line 109 and signal SDA (serial data address) on bi-directional serial data line 110. Because demodulator module 104 and FEC module 106 operate on parallel data, host interface module 108 includes two functional elements: an Mbus module 118a for converting the serial data input into parallel data format, and an QM module 118b for placing the parallel data into the corresponding registers for output onto bus system 130.

Bus system 130 includes an address bus 136, a data-in bus 138, and a data-out bus 139. Bus system 130 also includes a RAM page bus 137 for addressing a selected block of registers and RAMs in a module. Address bus 136 is coupled to the output terminals of an address multiplexer 132 to select address data received either from an external address bus 115 or from address register 108a on address bus 113. Data-in bus 138 is coupled to the output terminals of a data-in multiplexer 134 to select input data received either from a symbol bus 120 or from write register 108c on bus 114. Data-out bus 139 is coupled to the second input terminals of a data-out multiplexer 126. Address bus 136, data-in bus 138 and data-out bus 139 are also coupled to the corresponding input terminals of the configuration registers and RAMs of demodulator module 104 and FEC module 106.

During initialization, address multiplexer 132 and data-in multiplexer 134 are programmed to select the input signals on bus 113 and bus 114 respectively, representing the address and set-up data from host interface module 108. Control information such as register default values and the QAM constellation map is provided by the host computer to host interface module 108 through serial data lines 109 and 110. Initialization is complete when set-up data is written into the respective registers and RAMs of demodulator module 104 and FEC module 106.

After initialization, demodulation device 100 is ready to process incoming analog signals. During normal operation, ADC module 102 receives a quadrature amplitude modulated analog signal at an analog input terminal 101. ADC module 102 generates a 10-bit digitized representation of the analog signal on ADC output bus 103. ADC output bus 103 is coupled to the first input terminals of a bypass multiplexer 122 and also to the input terminals of a tristate ADC buffer 124. During normal operation, ADC buffer 124 is disabled and no data is driven onto the buffer output terminals, which are coupled to ADC test bus 115. Instead, bypass multiplexer 122 provides the 10-bit digital data of ADC output bus 103 to demodulator module 104 on bus 111. In this embodiment, the 10-bit ADC test bus 115 is coupled to the second input terminals of bypass multiplexer 122, and the second input terminals of address multiplexer 132 which receives only 9 bits of the 10-bit ADC test bus 115. The operation of ADC test bus 115 will be described in more details below.

Using the predefined demodulation algorithm, demodulator module 104 recovers symbols from the digital data on ADC output bus 103. The output terminals of demodulator module 104 are coupled to FEC module 106 through bus 105. FEC module 106 then performs error correction functions on a group of these symbols recovered and provide them on FEC output bus 112. FEC output bus 112 is coupled to the first input terminals of data-out multiplexer 126. In normal operation, data-out multiplexer 126 selects the 8-bit symbol on FEC output bus 112 and provides the 8-bit symbol to data-out buffer 128. Data-out buffer 128 is enabled and drives the 8-bit symbol onto symbol bus 120. Symbol bus 120 is an output bus of demodulation device 100.

ADC bypass multiplexer 122, Data-out multiplexer 126, and other multiplexers within demodulation device 100 allow the buses of demodulation device 100 to be utilized in a ADC test mode, a ADC bypass mode, and a module test mode.

Under the ADC test mode, bypass multiplexer 122 and ADC buffer 124 allow the analog circuits in ADC module 102 to be tested in isolation from the rest of demodulation device 100. An analog input signal is provided to ADC module 102 on analog input terminal 101 as in normal operation. Under the ADC test mode, ADC buffer 124 is enabled so that ADC output bus 103 is driven onto bi-directional ADC test bus 115 which is an external bus of demodulation device 100. Thus, under the ADC test mode, the analog circuits in ADC module 102 can be tested separate from the digital circuits of demodulation device 100.

Under the ADC bypass mode, demodulator module 104 and FEC module 106 are tested using digital data provided directly from a tester (not shown), thereby bypassing ADC module 102. Under the ADC bypass mode, the digital circuits of demodulation device 100 are tested using digital data received on ADC test bus 115 from a tester, instead of the digitized data from ADC module 102. When the ADC bypass mode is selected, ADC test buffer 124 is disabled so as to isolate ADC test bus 115 from ADC output bus 103. Instead, an external tester provides 10-bit data on bi-directional ADC test bus 115. Under the ADC bypass mode, bypass multiplexer 122 selects the 10-bit data on ADC test bus 115. In this manner, demodulator module 104 and FEC module 106 are tested using digital input data received directly from a tester. The output data of the modules are accessible on symbol bus 120 as in normal operation.

Under the module test mode, data-out multiplexer 126 and data-out buffer 128 allow symbol bus 120 to be used as a bi-directional data bus for testing the configuration registers and RAMs within the modules of device 100. The module test mode provides access to the internal registers and RAMs of the modules, increasing the testability and diagnostic capability of demodulation device 100. Furthermore, under the module test mode, the configuration registers and RAMs of demodulation device 100 are accessed using parallel data from ADC test bus 115 and symbol bus 120, instead of serial data from serial data lines 109 and 110. Therefore, at-speed testing of the memory units is possible.

Under the module test mode, an external tester drives bi-directional ADC test bus 115 to provide address input and read/write control to address multiplexer 132 for addressing the registers blocks and RAMs of the modules. Bi-directional symbol bus 120 provides the input data from and output data to the external tester. The modular reusable bus architecture allows writing and reading of all configuration registers and RAMs in the modules of demodulation device 100.

For example, to write a register block or a RAM, the external tester provides an input address and a write-enable control signal in the 10-bit datum on ADC test bus 115. In the module test mode, address multiplexer 132 selects this 10-bit datum on ADC test bus 115. The input address in the 10-bit datum selects a register or a RAM location that is coupled to bus system 130. During the write cycle of the module test module, data-out buffer 128 is disabled so that symbol bus 120 is not driven by demodulation device 100. Instead, the tester drives symbol bus 120 with input data. Data-in multiplexer 134 selects the data on symbol bus 120 and place the input data onto data-in bus 138 to be written into the selected register or RAM.

To read the registers and the RAMs, the tester provides an input address and a read-enable control signal through ADC test bus 115, which is selected by address multiplexer 132 and placed on address bus 136. Output data from the register or RAM location corresponding to the input address is placed on data-out bus 139. Data-out multiplexer 126 provides this output data to data-out buffer 128. In the read cycle, data-out buffer is enabled and the output data is driven onto symbol bus 120 for output to the tester.

The selection of the different operation mode is provided through an 8-bit control register MC_Reg[7:0] (not shown) in host interface module 108. In this embodiment, the operation modes are selected by writing a pre-defined value to bits 6 and 7 of the control register (MC_Reg[7:6]) through serial data lines 109 and 110. For instance, at power-up, demodulation device 100 is in normal mode where the value of MC_Reg[7:6] is "00." To select the ADC bypass mode, a value of "01" is written into MC_Reg[7:6]. To select the ADC test mode, a value of "10" is written into MC_Reg[7:6]. Finally, to select the module test mode, a value of "11" is written into MC_Reg[7:6]. In addition to selection of operation modes, control register MC_Reg[7:0] also provides a register locking mechanism which will be described in more details below.

In the present embodiment, a paging register Page_Reg [7:0] (not shown) is incorporated in host interface module 108 to control access to the configuration registers and memory units within the modules. Access to the configuration registers and memory units is determined by writing a predefined value into bits 5 through 7 of the paging register (Page_Reg[7:5]) through serial data lines 109 and 110. At power-up, paging register Page_Reg [7:0] is in the normal mode where page 0, Page_Reg[7:5]="000," is selected. Page 0 allows access to functional registers 104c and constellation RAM 104e in demodulator module 104. To access the test registers in demodulator module 104 and FEC module 106, a value of "111" is written to Page_Reg[7:5] which selects Page 7. To access the deinterleaver RAM 106b, a value of "001" is written to Page_Reg[7:5] which selects Page 1. To access the Reed Solomon RAM 106c, a value of "010" is written to Page_Reg[7:5] which selects Page 2. Other pages can be defined in Page_Reg[7:5] for access to ROMs and other memory units in the modules. Unused pages in Page_Reg[7:5] are reserved for future expansion when more registers and memory units are added to demodulation device 100.

Paging register Page_Reg[7:0] also serves the function of expanding the memory and register address space beyond that addressable by address register 108a. In the present embodiment, address register 108a provides a 7-bit primary address for specifying the address location within one block of registers or memory units. Bits 0 through 4 of paging register (Page_Reg[4:0]) can be used to address up to an additional 32 blocks of register and memory locations. The register and memory block address is written into Page_Reg[4:0] through serial data lines 109 and 110 and provided to the modules on Ram Page bus 137.

It is often desirable to limit user access to the test registers and special purpose memory units within a computer system to prevent an inadvertent write to these registers and special purpose memory units. The bus architecture of the present invention provides a register locking mechanism which protects paging register Page_Reg[7:0] from an inadvertent access. An inadvertent write can occur when register addresses are being automatically incremented. The present invention provides a register locking mechanism whereby writing to paging register Page_Reg[7:0] is permitted only when both a key and its inverse are provided to set bit 5 of control register MC_Reg[7:0].

Figure 2:
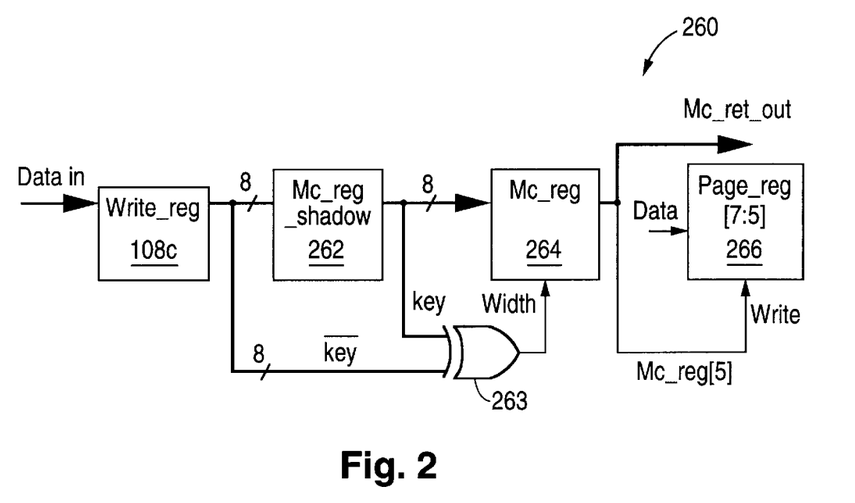
FIG. 2 is the block diagram illustrating a register locking mechanism of the present invention.

FIG. 2 illustrates one embodiment of the register locking mechanism which can be incorporated in host interface module 108 to protect paging register Page_Reg[7:0] from an inadvertent write. In the register locking circuit 260 of FIG. 2, control register 264 represents control register MC_Reg[7:0]. Control bit MC_Reg[5] controls the write-enable signal to bits 5 to 7 of paging register Page_Reg[7:0] which is represented in FIG. 2 by register 266. When MC_Reg[5] is reset, as it is during power-up of demodulation device 100, bits 5–7 of register 266 are locked. To unlock bits 5–7 of register 266, both a key and its inverse have to be provided. In a first cycle, a key provided to host interface module 108 through serial data lines 109 and 110 is written into write register 108c of host interface module 108. At the next cycle, the key in register 108c is stored into a shadow register 262 and provided to the first input terminals of an exclusive OR (XOR) gate 263. Within the same cycle, the inverse of the key is written into write register 108c. Since the output terminals of write register 108c are directly coupled to the second input terminals of XOR gate 263, the signals of first and second input terminals are compared. If the signals at the first and second input terminals of XOR gate 263 are different in every corresponding bit, the output signal of XOR gate 263 is asserted, enabling the writing of control register 264. The key is then written into control register 264. If the correct value of key is provided, MC_Reg[5] unlocks paging register 266, by asserting the write enable control terminal of bits 5–7 of paging register Page_Reg[7:0]. Because the bus architecture of the present invention provides access to all the internal registers and memory units of an integrated system, the register locking mechanism provides an effective means to control the manner of access to these registers and memory units such that normal system function is not compromised.

In the present embodiment, each of the register blocks and memory units within demodulation device 100 drives data-out bus 139 to output data. Because the bus architecture of the present invention is expandable, allowing large number of registers to be incorporated within the modules, data-out bus 139 can become heavily capacitively loaded, affecting the speed of the data output and overall speed of demodulation device 100. To prevent capacitive loading on data-out bus 139 from limiting the number of registers that can be added before speed of operation is degraded, the bus architecture of the present invention utilizes a double buffering technique to minimize the load on data-out bus 139. The two-level buffering technique isolates the capacitance of data-out bus 139 by reducing the number of elements directly connected to data-out bus 139.

Figure 3:
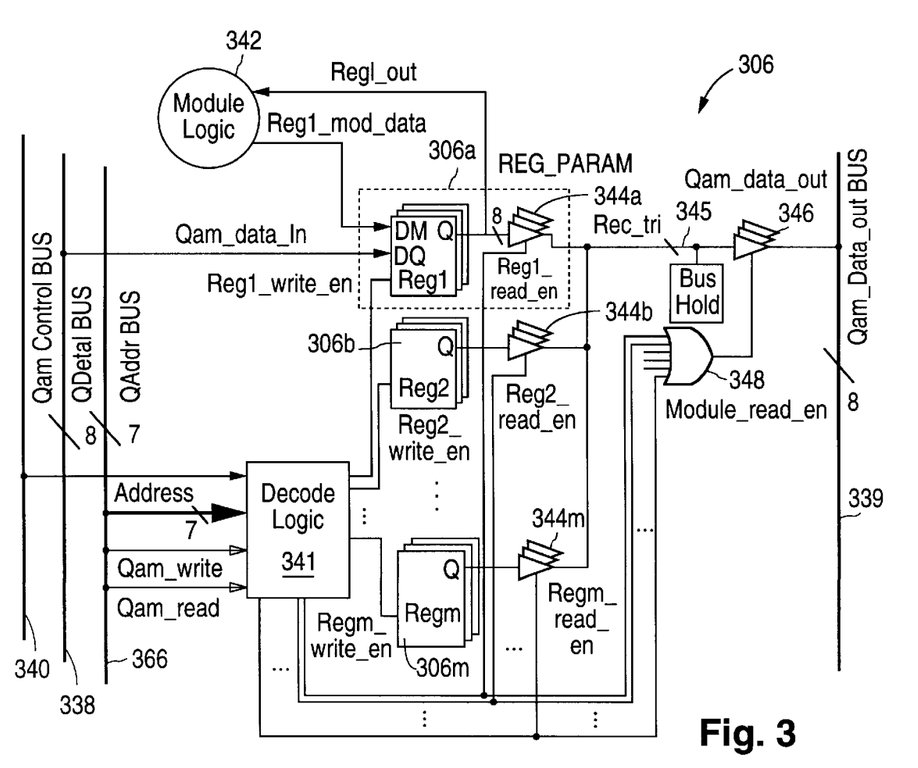
FIG. 3 is the block diagram illustrating a two-level buffering circuit employed in the modules of demodulation device 100.

FIG. 3 illustrates the two-level buffering technique in a module 306. Module 306 is representative of the modules described previously for demodulation device 100, such as demodulator module 104 and FEC module 106. In FIG. 3, module 306 includes a module logic block 342 and a decode logic block 341. Decode logic block 341 is coupled to the input buses of demodulation device 100, including address bus 336, data-in bus 338, and control bus 340. Based on the address and control signals received, decode logic block 341 generates read enable and write enable signals for the registers blocks, such as registers 306a, 306b, . . . and 306m. Registers 306a, 306b, . . . and 306m each has its own set of tristate buffers 344a, 344b, . . . and 344m, providing the first layer of buffering. Tristate buffers 344a, 344b, . . . and 344m drive a register bus 345. Tristate buffers 344a, 344b, . . . and 344m are sized according to the number of registers within the respective register 306a, 306b, . . . or 306m. Register bus 345 is coupled to another tristate buffer 346 which provides the second layer of buffering. Tristate buffer 346 drives data-out bus 339. The enable signal of tristate buffer 346 is controlled by the output signal of an OR gate 348, which results from an OR operation over all the individual register enable signals of registers 306a–306m. The two-level buffering technique as applied here reduces the number of buffers driving data-out bus 339 to the number of modules within demodulation device 100. The double buffering technique thus ensures that additional register blocks can be added to module 306 without introducing addition capacitive loading on data-out bus 339.

The modular reusable bus architecture of the present invention can be applied to support a system bus coupled to modules operating under different clock domains. The bus architecture of the present invention provides a synchronization circuit which can synchronize signals crossing different clock domains while maintaining data coherency and predictability. The synchronization circuit of the present invention can be applied in a system where the system bus operates on the fastest clock of the system while the modules operate on other clock frequencies which are synchronized to the fastest clock.

Figure 4:
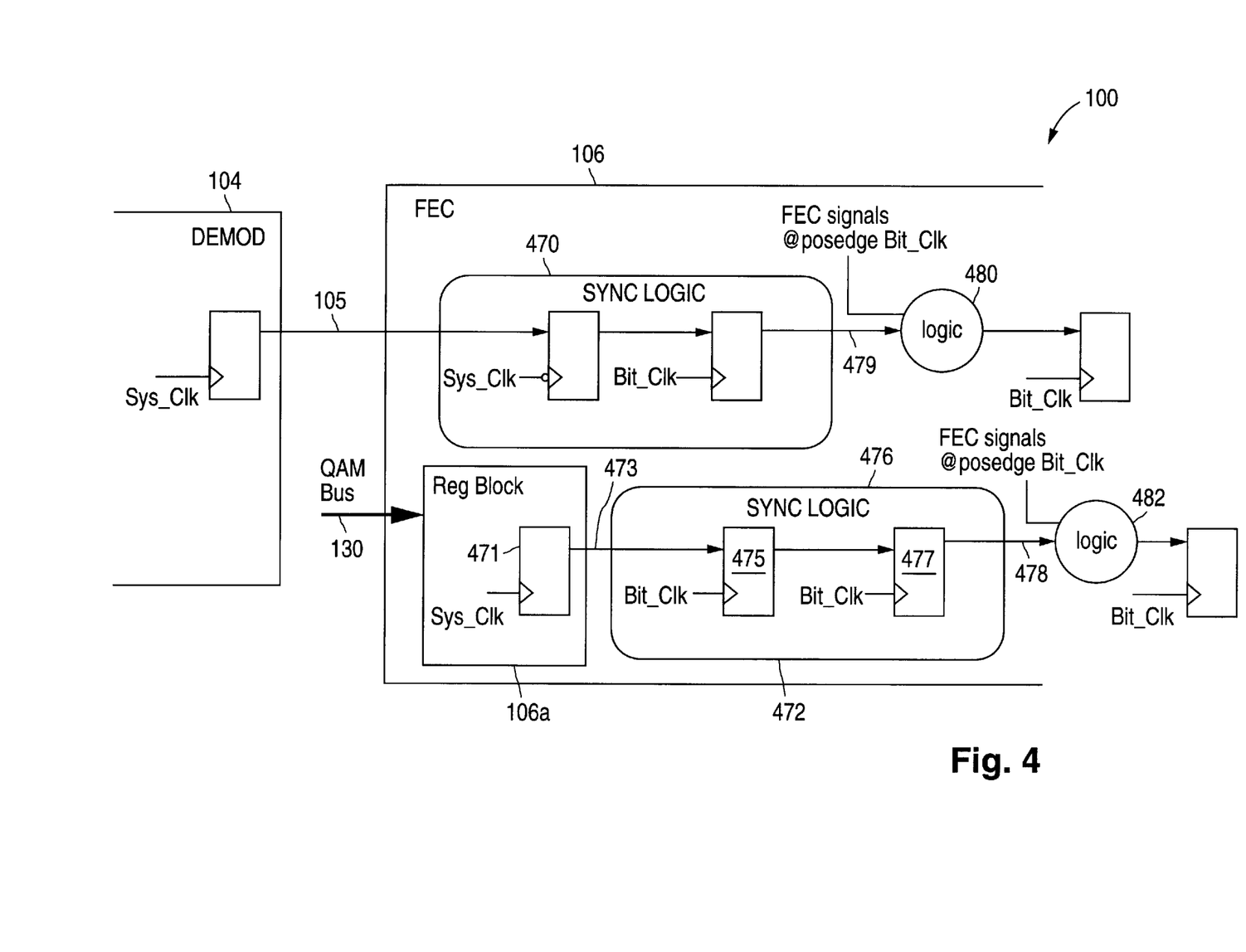
FIG. 4 is the block diagram illustrating the application of a synchronization circuit of the present invention in FEC module 106.

For example, in demodulation device 100 of FIG. 1, system bus 130 and demodulator module 104 operate under a system clock which is the fastest clock in demodulation device 100. Meanwhile, FEC module 106 operates under a bit clock which has a frequency one half that of the system clock. Referring to FIG. 4, two interfaces exist in demodulation device 100 where signals have to cross over different clock domains. The first interface is between bus 105 and FEC module 106. Bus 105, coupling demodulator module 104 and FEC module 106, is synchronized to the system clock. Bus 105 is coupled to logic circuits in FEC module 106 which runs on the bit clock. The second interface exists between the configuration registers and logic circuits in FEC module 106. Both bus system 130 and register block 106a in FEC module 106 are synchronized to the system clock. However, register block 106a is coupled to FEC logic circuit 482 which is synchronized to the bit clock.

Under the synchronization circuit of the present invention, signals crossing different clock domains are synchronized to the new clock and always appear at a predictable clock cycle. The synchronization circuit employs an "inverted clock sampling technique." The operation of the synchronization circuit is explained with reference to FIG. 4.

FIG. 4 illustrates the two clock domain interfaces described above: between demodulator module 104 and FEC module 106, and between register block 106a and FEC logic circuit 482 in FEC module 106. In FIG. 4, register block 106a is represented by a flip-flop 471 synchronized to the system clock. The output terminals of register block 106a are represented by a bus 473 which needs to be resynchronized to the bit clock before being coupled to FEC logic circuit 482. A synchronization circuit 472 is provided to resynchronize bus 473 to the bit clock. Synchronization circuit 472 comprises two synchronization flip-flops 475 and 477. Bus 473 is coupled to the input terminals of flip-flop 475 which runs on the complement signal of the system clock. Since the data on bus 473 has been synchronized by a rising edge of the system clock in flip-flop 471, the data on bus 473 can always be resynchronized successfully to the falling edge of the same system clock. Because the falling edge of the system clock is the rising edge of its complement, the rising clock edges of flip-flop 471 and flip-fop 475 will not skew past each other. Thus, data on bus 473 can be successfully synchronized to the complement of the system clock by flip-flop 475.

After being synchronized to the complement signal of the system clock, output terminals 476 of flip-flop 475 are coupled to the input terminals of flip-flop 477. Flip-flop 477 is synchronized to the bit clock which is a divide by two of the system clock and operates off the rising edge of the system clock. Because the bit clock is a divide by two of the system clock, the rising edge and falling edge of the bit clock coincide with the rising edge of the system clock. However, the falling edge of the system clock, which is also the rising edge of it complement, does not coincide with any edges of the bit clock. Instead, the rising edge of the complement of the system clock occurs between the edges of the bit clock. Therefore, the rising edge of the complement of the system clock will never jitter past the edges of the bit clock. Thus, output terminals 476, synchronized to the complement signal of the system clock, can be successfully resynchronized to the bit clock by flip-flop 477 without ambiguity as to the clock cycle at which data appear on bus 478, the output terminals of flip-flop 477. Bus 478, may then be coupled to FEC logic circuit 482 and other circuits in FEC module 106 which are synchronized to the bit clock. Here, synchronization circuit 472 is applied to bus system 130 which includes parallel data buses such as address bus 136, data-in bus 138, and data-out bus 139. Synchronization circuit 472 preserves data coherency across these parallel data buses, enabling accurate testing of demodulation device 100 without testing errors due to jittering of clock edges.

FIG. 4 also illustrates another instance of the synchronization circuit as applied to a serial data line. Here, synchronization circuit 470, identical to circuit 472, is provided to resynchronize bus 105. Synchronization circuit 470 assures that bus 105 will be resynchronized to the bit clock and that data will appear on output bus 479 in a predictable and consistent clock cycle. Output bus 479 can then be coupled to FEC logic circuit 480 which is synchronized to the bit clock. The synchronization circuit of the present invention introduces a one-cycle latency when signals cross over from the system clock domain to the bit clock domain. However, the resynchronized signal will always appear at a predictable clock cycle, allowing the testing of signals which have crossed over different clock domains.

The above detailed description are provided to illustrate the specific embodiments of the present invention and is not intended to be limiting. Numerous modifications and variations within the scope of the present invention are possible. The present invention is defined by the appended claims thereto.

We claim:

1. A bus architecture for a computer system, said computer system having a first, a second, a third and a fourth module coupled together, each module having disposed within configuration registers and memory units, the bus architecture comprising:

an input bus coupled to input terminals of said first module;

a first multiplexer having a first set of input terminals coupled to output terminals of said first module, and output terminals coupled to input terminals of said second module;

a first bus connecting output terminals of said second module to input terminals of said third module;

a bi-directional test bus coupled to a second set of input terminals of said first multiplexer;

a first buffer having input terminals coupled to said output terminals of said first module, and output terminals coupled to said test bus;

a second multiplexer having a first set of input terminals coupled to said test bus, a second set of input terminals coupled to address output terminals of said fourth module;

an address bus connecting output terminals of said second multiplexer to address input terminals of configuration registers and memory units of said second and third modules;

a third multiplexer having a first set of input terminals coupled to input data terminals of said fourth module;

a data-in bus connecting output terminals of said third multiplexer to input data terminals of said configuration registers and memory units of said second and third modules;

a bi-directional data bus coupled to a second set of input terminals of said third multiplexer;

a fourth multiplexer having a first set of input terminals coupled to output terminals of said third module;

a data-out bus connecting output data terminals of said configuration registers and memory units of said second and third modules to a second set of input terminals of said fourth multiplexer, and to output data terminals of said fourth module; and a second buffer having input terminals coupled to output terminals of said fourth multiplexer, and output terminals coupled to said data bus.

2. The bus architecture of claim 1, wherein said first module is tested separate from said second, third, and fourth modules by applying input signals to said input bus, enabling said first buffer, and monitoring said test bus for output signals from said first module.

3. The bus architecture of claim 1, wherein said plurality of modules, besides said first module, are tested by disabling said first buffer, applying input signals to said test bus, and multiplexing said input signals on said test bus through said first multiplexer to said input terminals of said second module.

4. The bus architecture of claim 1, wherein said configuration registers and memory units within said plurality of modules are tested by applying address signals to said test bus, multiplexing said address signals through said second multiplexer to said address input terminals of said configuration registers and memory units, applying input data signals to said data bus when said second buffer is disabled, and multiplexing said input data signals through said third multiplexer to said input data terminals of said configuration registers and memory units.

5. The bus architecture of claim 4, wherein output data signals from said configuration registers and memory units are provided on said data-out bus, and said fourth multiplexer multiplexes said output data signals to input terminals of said second buffer, whereby when said second buffer is enabled, said output data signals are passed to said data bus.

6. The bus architecture of claim 1, wherein said configuration registers include registers incorporated for testing and diagnostic purposes.

7. The bus architecture of claim 1, wherein said fourth module further comprises a control register for providing control signals to said first and second buffers, and said first, second, third and fourth multiplexers.

8. The bus architecture of claim 1, wherein said fourth module further comprises a paging register for providing control signals for selectively accessing said configuration registers and memory units.

9. The bus architecture of claim 8, further comprises a page bus coupled to said paging register for specifying register and memory locations within said configuration registers and memory units, wherein said paging register supplies addresses for specifying register and memory locations in addition to said address bus.

10. The bus architecture of claim 8, wherein said paging register can be written only when a key signal and a complement of said key signal are provided in succession to said fourth module.

11. The bus architecture of claim 8, wherein said fourth module further comprises a locking circuit for protecting said paging register from an inadvertent access, said locking circuit comprising:

a shadow register having input terminals coupled to a key input bus;

an exclusive OR gate having a first set of input terminals coupled to said output terminals of said shadow register and a second set of input terminals coupled to said key input bus; and a control register having input terminals coupled to output terminals of said shadow register, a write-enable control input terminal coupled to an output terminal of said exclusive OR gate, and an output terminal coupled to a write-enable control input terminal of said paging register;

wherein when a predefined data signal and its complement are provided on said key input bus in succession, said output terminal of said exclusive OR gate asserts said write-enable control input terminal to said control register; said predefined data signal is written into said control register, causing said output terminal of said control register to assert said write-enable control input terminal of said paging register.

12. The bus architecture of claim 1 wherein said configuration registers within each module comprise a plurality of register blocks, output data terminals of each register block are coupled to input terminals of a first output buffer, output terminals of all of said first output buffers of all of said register blocks are coupled to input terminals of a second output buffer, and output terminals of said second output buffer are coupled to said data-out bus.

13. A method for separately testing a first module and a second module within a computer system, said method comprising the steps of:

applying analog input signals to input terminals of said first module;

enabling a first buffer for coupling output signals on output terminals of said first module to a test bus;

monitoring said test bus for output signals from said first module;

disabling said first buffer;

applying input signals to said test bus;

multiplexing said input signals on said test bus to input terminals of said second module; and monitoring output terminals of said second module for output signals from said second module.

* * * * *